(12) United States Patent
Vataja

(10) Patent No.: US 7,899,184 B2
(45) Date of Patent: Mar. 1, 2011

(54) ENDS-MESSAGING PROTOCOL THAT RECOVERS AND HAS BACKWARD SECURITY

(75) Inventor: Pentti Kimmo Sakari Vataja, Tammisaari (FI)

(73) Assignee: Pisaramedia Oy, Degerby (FI)

( * ) Notice: Subject to any disclaimer, the term of this patent is extended or adjusted under 35 U.S.C. 154(b) by 559 days.

(21) Appl. No.: 11/571,568

(22) PCT Filed: Sep. 2, 2004

(86) PCT No.: PCT/IB2004/051670
§ 371 (c)(1),
(2), (4) Date: Jan. 3, 2007

(87) PCT Pub. No.: WO2004/100496
PCT Pub. Date: Nov. 18, 2004

(65) Prior Publication Data
US 2008/0095371 A1    Apr. 24, 2008

(51) Int. Cl.
*H04L 9/00* (2006.01)

(52) U.S. Cl. ............ 380/277; 380/45; 380/47; 380/278; 380/279; 380/280; 380/282; 380/283; 380/285

(58) Field of Classification Search ............... 380/47, 380/45, 277–280, 282, 283, 285
See application file for complete search history.

(56) References Cited

U.S. PATENT DOCUMENTS

| | | | | |
|---|---|---|---|---|
| 6,085,320 | A * | 7/2000 | Kaliski, Jr. | 713/168 |
| 2002/0159598 | A1* | 10/2002 | Rubinstein et al. | 380/259 |
| 2002/0191796 | A1* | 12/2002 | Muschenborn | 380/277 |
| 2006/0155985 | A1* | 7/2006 | Canard et al. | 713/156 |
| 2007/0160201 | A1* | 7/2007 | Blom et al. | 380/30 |

OTHER PUBLICATIONS

Canetti et al. ('A Forward-Secure Public-Key Encryption Scheme', Inproceedings, 2003, pp. 255-271, http://eprint.iacr.org/2003/083. pdf).*
Bellare et al. ('Forward-Security in Private-Key Cryptography', An extended abstract of this paper appears in the Proceedings of the CT-RSA 2003 conference. This is the full version. Date: May 5, 2001, last revised Nov. 18, 2002; pp. 1-24, http://eprint.iacr.org/2001/035).*

* cited by examiner

*Primary Examiner* — Carl Colin
(74) *Attorney, Agent, or Firm* — Kenyon & Kenyon LLP

(57) ABSTRACT

The presented messaging protocol uses three new public keys in a signed and encrypted message to achieve backward security and recovery in an environment where an attacker now and then obtains the security parameters in exposed, decrypted form. Backward security is understood to mean that an adversary cannot decrypt those captured encrypted messages that the user has decrypted prior the exposure. The recovery of the protocol means that the attacker at some point of time after the exposure cannot any more decrypt messages created after the exposure. The invention can be used e.g. in encrypted email communication. New to the current state of the art is that a message contains history data: a list of recently used public keys and their Diffie-Hellman counterparts. Also new is the usage of a stored and pseudorandomly changing data used together with a just computed Diffie-Hellman shared secret to provide a value that an attacker cannot produce if he does not have a proper exposed security data and the private key required to compute the Diffie-Hellman shared secret.

20 Claims, 2 Drawing Sheets

ENDS-MESSAGING PROTOCOL THAT RECOVERS AND HAS BACKWARD SECURITY

TECHNICAL FIELD

The invention is about encrypted communication and its protocol. A specific emphasis is placed on the backward security and recovery properties of the protocol. It is assumed that an adversary can now and then expose all of the cryptographical security data i.e. private keys and other data stored on participants' computers. The presented method tries to make the damages of security data exposure as small as possible. Practical example where the protocol can be used is encrypted email.

BACKGROUND ART

We address the problem of encrypted communication over insecure networks using computers whose contents can occasionally be studied by an adversary. Insecurity of the network means that it must be assumed that not necessarily every encrypted message reaches the intended receiver. The messages may be received at different order than they were sent. It is also expected that an adversary can now and then expose all of the cryptographical security data i.e. private keys and other data stored on participants' computers. The adversary then uses this exposed snapshot of security data (called shortly snapshot) to obtain as many previous or future plaintexts as possible. The presented method tries to make the damages of the security data exposure as small as possible.

Practical example is encrypted email communication. Even if every message would reach its destination the user may process only some of them and those in an ad hoc order. The user should be able to enjoy the backward security concept: An exposure of current security data should not compromise previously decrypted data. Clearly also the recovery i.e. the regaining of the state where the adversary cannot decrypt messages created after the snapshot would be a great advantage. It must be assumed that the user has no knowledge of the attackers success.

The usage of backward security was mentioned by Ross Anderson in an invited lecture in Fourth Annual Conference on Computer and Communications Security. ACM, 1997. Summary appears in: Two remarks on public key cryptology "http://www.cl.cam.ac.uk/users/rja14/", 2001. Also the idea of protecting future communication after the exposure is discussed in the paper. According to Anderson in traditional (symmetric) systems, the backward security is provided by key updating: "two or more principals who share a key pass it through a one-way hash function at agreed times: $K_i=h(K_{i-1})$." Because of the one-way function the previous key cannot be derived from the current key.

The future keys however can de derived by the attacker. To protect them "two or more principals who share a key hash it at agreed times with the messages they have exchanged since the last key change: $K_{i+1}=h(K_i, M_{i1}, M_{i2}, \ldots)$". Backward security is still provided and also protection of future messages if the attacker misses one previous message. As noted by Anderson the advent of public key cryptography and Diffie-Hellman (DH) key exchange offers a stronger form of protection: when fresh public DH keys have been exchanged the security has been regained even if all the previous traffic is decrypted by the opponent. In this invention the idea that some kind of representation of previous keys affects new ones is used together with the possibilities that the DH key exchange offers.

This recovery or freshness feature of the DH key exchange between two parties is widely used in the handshake phase of interactive session protocols. During the initial handshake the DH key exchange is performed and the shared secret is used as a security parameter for later message exchange. The individual messages during the session are then encrypted/decrypted on the basis of these parameters without any further DH exchange. If an attacker obtains the private key of one of the DH parties the whole session is exposed. This invention can also be seen as an approach to improve the security after the initial handshake. Please note that the communication need not necessarily be an online one. The presented protocol can naturally be used even if there are days between message movements—an example being email communication. Essential is that in the beginning the two communication parties are introduced to themselves via the protocol initialization.

The current literature that deals with the problem of backward security in digital signatures and in encryption uses public keys in their more traditional meaning: one public key is distributed to many persons, which can then use it to send encrypted messages to the creator of the public key. The backward security methods in current literature are developed for this more general case. In this invention however the public keys used are intended to be used only between two specific and fixed communication parties—the fixed sender and the fixed receiver. In this sense our keys could be called session keys between two parties. In our method when two persons send a message to the same receiver both senders use different public keys of the receiver. The senders have no knowledge of the public key the other sender uses. The more general case where only one public key is reserved for many senders leads to more complex solutions. Please note that the current literature also uses the term forward-security in the same sense we use the term backward security: a current exposure does not expose old decrypted communication. The first method for the general case is R. Canetti, S. Halevi, J. Katz: A Forward-Secure Public-Key Encryption Scheme. EUROCRYPT 2003, LNCS 2656, 255-271. Springer-Verlag, 2003. Their method does not provide recovery. The recovery is added by Y. Dodis, M. Franklin, J. Katz, A. Miyaji, M. Yung: Intrusion-Resilient Public-Key Encryption. Topics in Cryptology-CT-RSA 03, Lecture Notes in Computer Science Vol. 2612, M. Joye ed, Springer-Verlag, 2003. This approach uses special update and refresh messages.

If the presented protocol is used in e.g. email communication each new contact must be processed through the protocol initialization phase. If the methods based on the more general usage of public keys are used this need not be done—however a public key must have somehow been delivered to the sender of the first message. Our initialization requires that both parties send one initialization message. Our protocol provides backward security and recovers when messages are exchanged.

In symmetric encryption setting the problem of protecting old traffic is studied by M. Bellare, B. Yee: Forward-Security in Private-Key Cryptography. Extended abstract in Topics in Cryptology-CT-RSA 03, Lecture Notes in Computer Science Vol. 2612, M. Joye ed, Springer-Verlag, 2003. They recommend the usage of forward-secure pseudorandom bit generators to be used as a central primitive. This is our approach too. Their construction is such that the generator's input is a previous state (seed) and it generates a new state and the required random output bits. The old state is destroyed. If from the generated output bits it is infeasible to derive the previous state (seed) used, then the construction protects old outputs. To this construction we add another input: a Diffie- Hellman shared secret. This is added to provide the recovery feature. Our state is maintained in both computers and these states are required to go through same values during the communication.

By pseudorandomness it is understood to mean that it is infeasible to derive the initial seed from the outputted bits or another outputted bit from another ones and that if the seed is unknown the outputted bits are unpredictable. One construction that can be used is based upon the Goldreich-Levin hard-core bit and Blum-Micali iteration, see O. Goldreich, L. Levin: A Hard Core Predicate for any One Way Function. Proceedings, 21st ACM STOC, 1989, 25-32. and M. Blum, S. Micali: How to Generate Cryptographically Strong Sequences of Pseudo-random Bits. SIAM Journal of Computing, 13. no 4, 1986, 850-864. Another PRG providing similar properties i.e. pseudorandom bits can be used instead of this generator.

Let's now look the usage of DH exchange more closely. In traditional DH key exchange both parties send one message before the shared secret is computed and the actual encryption of the plaintext can be done. To provide optimal backward security and recovery one could do the DH exchange always before a plaintext should be encrypted. However, now only one third of the messages would carry information. Assume now that the attacker obtains one of the private keys. Then he could decrypt one cryptotext based on the obtained private key.

If the messaging would always happen in turns—every message is replied—the DH exchange could be done so that every message carries one new public key for immediate DH calculation to decrypt the encrypted text in the message and one another new public key for the next message to be received. Every private key would be destroyed after the DH calculation. Every message would carry information and again the attacker could only read one message based on one obtained private key.

Problems will arise if a participant is allowed to send many messages before receiving a new public key. The sender of many consecutive messages must use the most recently received public key for all the messages he sends. If the attacker obtains the corresponding private key the backward recovery will be lost, the attacker can read all messages decryptable by this private key even if he obtains the key just before the last such message is decrypted.

One development further would be to include a fixed number of new public keys in every message; the sender would prefer to use a public key only once. Suppose now that a sender will never use more messages than this fixed number before receiving a new set of public keys. Consider now the properties of such a system. There would be backward security and protocol would recover when the sender has received a new set of public keys. The presented invention will have backward security and recover at same time like this obvious fixed case but it uses only 3 new public keys in every message without a limit on the number of consecutive messages sent. One of the 3 keys is used for immediate DH calculation and two other ones are delivered to the message's receiver to be used in his next sendings.

SUMMARY OF INVENTION

The presented protocol uses public key encryption and utilizes 3 new public keys in every message. These keys are randomly (pseudorandomly) generated i.e. randomness is collected from some source and pseudorandom generator produces the private keys, then the seed is destroyed. One of the public keys is used for immediate DH computation—two keys are reserved for future DH computations. New to the current state of the art is that a message may contain history information: a list of recently used DH public keys and identifiers of their DH counterparts. Also stored old data called state is used together with a pseudorandom bit genrator (PRG) when generating a new state and symmetric key—a symmetric key is produced not only by a result of DH shared secret computation, but also with the help of this old data. A block cipher uses the produced symmetric key to encrypt or decrypt one message.

The used PRG must have following properties: the bits produced must be pseudorandom and unpredictable i.e. from the result it must be infeasible to derive the seed or another outputted bit from another ones, also if the seed is unknown it must be infeasible to derive the outputted bits. We arrange things so that the initial seed $x_0$ will be unknown to the attacker if he either misses a state or a DH shared secret—the seed $x_0$ is set to be the xor'd value of both of them.

One PRG that can be used is described next. Now let f be a one-way permutation and r a random binary vector, $x_0$ is the initial seed, b(r,x) is a function that computes the Goldreich-Levin hard-core bit from x. Due to the Blum-Micali theorem of iterating a one-way permutation and Goldreich-Levin hard-core bit the n bits $b(r,x_0)$, $b(r,f(x_0))$, $b(r,f(f(x_0)))$ ... $b(r,f^{n-1}(x_0))$ are pseudorandom and unpredictable if $x_0$ is unknown, the random vector r need not be unknown. The random vector r is chosen to be the DH shared secret. This PRG has the required properties. In this construction the required one-way permutation can be emulated by a block cipher's encryption operation, see the detailed description section.

Now if the adversary wants to proceed forward but cannot produce $x_0$ he cannot produce the outputted bits. If the adversary wants to go backwards and has obtained the outputted bits and the DH shared secret he still cannot determine $x_0$. Neither can other outputted bits be derived from each other if some of them are revealed to the adversary.

The history information in messages is needed because it enables the states being produced in forward proceeding order even if messages are not decrypted in order. In such a case the history data: a list of recently used DH public keys and identifiers of their DH counterparts—is read and used to produce the states and keys in order. A produced key is stored together with its message number. When a message corresponding to this number should be decrypted the key is fetched from the store and then removed. Only the minimum amount of history information needed is included in a message. When a message is decrypted the history data to be placed in the next outgoing message can be decided. The history data although consisting of public keys is encrypted—this is done to prevent a casual observer from doing any conclusions from it. This encryption key is derived from the DH shared secret without the stored state.

When encrypting we do not store the private key used to produce the DH shared secret. This implies that the sender cannot decrypt his own sent messages but neither the adversary can decrypt outgoing messages based on a snapshot from sender's computer.

The protocol has recovered when the last snapshot the attacker has does not contain the private key whose corresponding public key will be used in the next encrypted message to be received. Consider the case where the persons involved encrypt and decrypt messages in turns (they decrypt a message and then send a reply) and the snapshot is obtained from one computer. The adversary can decrypt depending on the timing of the snapshot either 0 or 1 message until the protocol recovers. If messages are not exchanged in turns but many messages are received before a new one is sent it may also happen that adversary can't decrypt a single message. If the timing of the snapshot is better messages can be decrypted until the sender receives new public keys.

Two of the new public keys in a message are intended for the receiver of the message to be used in his next sendings as DH counterparts. One of the keys is used only once in a DH calculation, the other one is used many times if no newer public keys are available. The usage of the one-time key prevents in certain situations the attacker of using an older snapshot in order to decrypt more messages than a newer snapshot enables.

All the messages are signed using the digital signature method of the underlying public key scheme. The private/public key pair used is selected to be the other one than the one-time one of the latest public keys the intended receiver is known to posses. The plaintext ends with a mac-value. The PRG produces the corresponding mac-key together with the encryption/decryption key. The verification of the mac ensures that proper symmetric keys were used and the plaintext was created by the sender and was decrypted successfully. Note that the protocol relies on the states on different computers being updated in synchronous way, thus e.g. a restored backup of the security data may destroy this dependency.

As extra countermeasure against certain kinds of attacks the two new public keys in a message can be encrypted together with the plaintext. Note that then an attacker cannot know a DH counterpart unless he has decrypted a previous message or obtained a proper snapshot. This provides protection if the underlying public key scheme or its implementation has weaknesses. Note also that the protocol itself without this encryption of public keys provides same kind of protection: a DH shared secret alone is not sufficient to produce a symmetric key—the previous stored state is also required.

The underlying public key scheme might be a RSA one or based on elliptic curves or some other scheme. On elliptic curves the public key generation can be done on tens of milliseconds even if currently adequate field size is used.

To decrypt more messages the attacker may want to launch a so-called man in the middle attack. This is easiest to the attacker if he succeeds in obtaining the snapshots of both communication parties' security data at the same time. Lets assume the parties involved are Alice and Bob, the adversary being Charlie. Alice now sends a message to Bob. Charlie captures the message and uses the snapshot of Bob's data to decrypt it and then uses Alice's snapshot to encrypt it again for Bob and only then passes the message to Bob. This can continue as long as the adversary wishes. Every message from Bob and from Alice can and must be decrypted/encrypted. Another way to start this kind of attack is to modify the security data on Alice's computer and send a message to Alice pretending it being from Bob or to create a message to Bob based on the knowledge obtained from a snapshot from Alice's computer. The man in the middle attack can be detected if a cryptographic hash value (used as a checksum) is computed from the message. The hash value on Alice's computer of a message sent from Alice's computer will differ from that of at Bob's computer if there is an active man in the middle attack. If the adversary wants to stop this attack and not arouse any suspicion he has to modify the security data on at least one of the computers involved. If during active man in the middle attack one of the messages is not captured and changed by the attacker the receiver will not be able to verify its signature.

DETAILED DESCRIPTION

Figure 1:
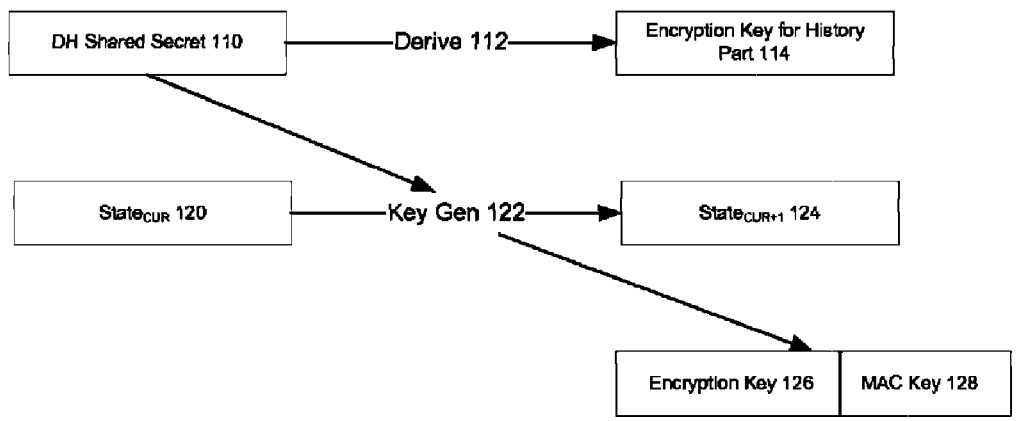
FIG. 1 illustrates an encryption operation according to an embodiment of the present invention.

A message has three parts: public, history and the text part.

The public part consists of: identifier of the receiver, message number, a new public key (called refresher), identifier of the refresher's Diffie-Hellman counterpart (called DH identifier), 2 new public keys (called one-time and repeater) and the message text part's starting position. As an option the one-time and repeater public keys can be placed together with the message's text and be thus encrypted.

History part: number x, a list of x number of items each consisting of a public key and the corresponding DH identifier (this list of items is called history data).

Text part: the message text, optionally the one-time and the repeater public keys may be placed here, a mac-value.

The message ends with a digital signature of the whole message.

New to the current state of the art is that a message contains history data: a list of recently used public keys and their DH counterparts. Using this history data it is possible to have a state in both the sender's and the receiver's computer that goes through same values even if some of the messages sent are never received or not decrypted. The reader should also notify the usage of two different kinds of public keys: a one-time one and one that is used if no newer public keys are available.

The public part is not encrypted, others are but with different symmetric keys. The history part's key is derived from the public part's DH shared secret without the use of the so-called key generator. The text part's key is derived using the key generator. A block cipher performs the encryptions/decryptions.

A security data storage (store) hosts for each messaging contact:

Sent keys collection (a public and private key, a message number that carried the keys)

Signature keys collection (a public key for signature verification and a message number)

Waiting keys collection (a message number, a public key for signature verification, a symmetric key and a mac-key)

History data items (each item consisting of a message number and a sent public key and the DH identifier of the corresponding public key)

Two states: one for sending and one for receiving (a state has two blocks $b_0$ and $b_1$, their size is the size of a DH shared secret).

Also stored are:

Latest received one-time and repeater public keys and the message's number that carried them Latest sent repeater key the receiver is known to posses.

This storage is in user's computer typically in encrypted form and a password or a passphrase is needed for its use. When the protocol is used for encryption or decryption this storage must be available to the protocol. If an attacker succeeds in obtaining the data in this storage in decrypted form he is said to have obtained an exposed snapshot (shortly snapshot) of the security data.

A key generator produces a new state, the symmetric key for encryption or decryption and the mac-key for plaintext verification. The encryption/decryption key and mac-key are called shortly symmetric keys. Part of the key generator's input comes from the security data storage: the state, the other part of the input is a newly computed DH shared secret. The key generator uses a pseudorandom bit generator (PRG) to produce its output. We arrange so that the initial seed $x_0$ to the PRG will be unknown to the attacker if he either misses a state or a DH shared secret—the seed $x_0$ is set to be the xor'd value of both of them. This is a new construction compared to the current state of the art.

The used PRG must have the following properties: the bits produced must be pseudorandom and unpredictable i.e. from the result it must be infeasible to derive the seed or another outputted bit from another ones, also if the seed is unknown the outputted bits must be infeasible to derive.

We next describe one possible PRG.

Let $GL(r,x)$ be a function computing the Goldreich-Levin hard-core bit from bit vectors x and r, r and x being of equal length. The GL bit is defined to be the inner product of x and r modulo 2: $(x_1r_1+x_2r_2 + \ldots +x_nr_n)$ mod 2, where the indices are the corresponding bits of x and r.

Let Enc(key,plaintext) be an encryption operation of a block cipher.

Let blocks $b_0$ and $b_1$ be the old state, k be the number of bits in the old state and in the symmetric keys. Let $dr_i$ be the i'th derived pseudorandom bit and x a bit vector.

Key generator—derive the new state and the symmetric keys:

Produce a block unknown to the attacker if he misses $b_0$ or DH shared secret:

x=$b_0$ xor DH shared secret
Run the PRG:
For i=1 to k
$dr_i$=GL(DH shared secret,x)
x=Enc(x,$b_1$)
End for The produced bits $dr_i$, i=1 ... k will form the new state and the symmetric keys. Note that the usage of the Enc-function is the usual way to construct a one-way hash function using a block cipher: to compute a one-way hash of x compute Enc (x,p) where p is some fixed known plaintext. In our case the fixed plaintext varies between invocations of this PRG but stays the same during a specific invocation. If the attacker obtains a state $s_m$ and the next state $s_{m+1}$ but misses a DH shared secret he still cannot run the PRG forward from $s_m$. From the produced state $s_{m+1}$ due to the pseudo-randomness of the hard-core bits he cannot derive other produced bits (the symmetric keys) or the initial seed x. If the $b_1$ would be the same during all invocations of this PRG (if $b_1$ is hard coded in the program) the attacker could without obtaining a snapshot perhaps try to guess the initial x (the result of the xor-operation). Now he has to obtain the snapshot and guess the initial x or without a snapshot guess both initial x and $b_1$. The properties of this PRG allow the usage of the block $b_1$ and the DH shared secret in producing the outputted bits without compromising the unpredictability and pseudorandomness of the results.

Consider now sending a message. Three new public keys are generated (called one-time, repeater and refresher). These keys are randomly (pseudorandomly) generated i.e. randomness is collected from some source and a pseudorandom bit generator produces the keys, then the seed is destroyed. The used PRG can be of a Blum-Micali Goldreich-Levin type or a different one—essential is that the seed is destroyed and that a private key cannot be determined from another one.

This message's number is set to be one greater than the latest one sent. The generated one-time and repeater public keys are placed into their places in the message and the one-time private key and the repeater private key are stored in the sent keys collection. The refresher key is placed into its place in the message, however its private key is not placed into the store.

From the store the message receiver's latest one-time and repeater public keys are fetched together with the message's number that carried them. If the receiver's one-time key has not been used before when sending then it is used as the DH counterpart otherwise the receiver's repeater key is used. The DH shared secret is computed with the receiver's selected key and with the sender's refresher key. In the public part of the message the DH identifier is set to be the message number that carried the DH counterpart and a value indicating whether the one-time or repeater key is used. When the shared secret has been computed the private key of the sender's refresher key is destroyed without it being stored. This will have the implication that the sender cannot decrypt messages sent from him, but neither can the adversary use a snapshot to decrypt outgoing messages. Adversary's possibilities are limited to incoming messages.

Next from the store the history data items for the receiver are fetched and copied into the message. A symmetric key is derived from the DH shared secret (by e.g. computing its hash value) and the history part of the message is encrypted with this key. The new history data to be stored is build by adding this message's number and the refresher public key and the identifier of its DH counterpart to the top of the old history data. The message text part's starting position field in the message's public part is adjusted based on the size of the history part.

Next the key generator is used the input being: the state for sending messages and the just computed DH shared secret. The new generated state is stored and the outputted symmetric mac-key is used to calculate text's mac-value (if the option of placing the one-time and repeater public keys together with the text is used then they are also included in this mac) and a block cipher encrypts the message text part using the produced encryption key.

The whole message is digitally signed. The private/public key pair used in signing is selected to be the sender's latest repeater key the receiver is known to posses. The receiver's latest repeater public key and this message's number that is being sent are stored in the signature keys collection.

Consider now decrypting a message. Based on a comparison between this message's number and the greatest number decrypted so far we consider three cases: 1) This message's number is one greater; 2) This message's number is two or more greater; 3) This message's number is less.

If cases 1 or 2 apply then a message number x is extracted from the public part's DH identifier. From the store's signature keys collection a public key is fetched based on this number x. The signature at the end of the message is verified using this public key. If the signature does not verify the decryption is abandoned.

The private key identified from the DH identifier is fetched from the store's sent keys collection. The DH shared secret between the fetched key and message's refresher public key is computed and a symmetric key is derived from it in order to be able to decrypt the history part of the message.

If we are on case 1 then the state for receiving is fetched from store and the key generator uses the state and the DH shared secret to generate the new state and to output the symmetric keys. The outputted symmetric key is used by a block cipher to decrypt the message's text part. The mac-key produced is used to calculate a mac-value of the plaintext. The calculated mac-value is checked against the value found after the plaintext and if found being different the decryption phase is abandoned. The new state is stored. The received new public keys (one-time and repeater) are now the latest ones and they are stored. The latest repeater key the sender is known to posses is now set to be the repeater key that was in the message x when x was sent (the key is fetched from the sent keys collection).

If we are on case 2 there are messages that have not been decrypted between the latest decrypted one and this message. The history part of this received message is decrypted and the key generator will be run to produce the symmetric keys for each message between the latest decrypted one and this message. From the history data list the first not yet processed refresher key and its DH identifier are identified based on the message number in the DH identifier. The list is processed each item in turn and the key generator is run to produce the next state and the symmetric keys. At the same time also a public key is determined that must be used to verify the signature of the message in question. For each message the generated keys and signature verification public key will be stored in the waiting keys collection together with the message number in question. This storing into the waiting keys collection will actually take place only after this message's mac-value has been verified. When the last item in history data has been processed the current message's DH shared secret and the state produced by the iteration on history data are inputted to the key generator. The outputted symmetric keys are used to decrypt and verify this message's text. If the mac-value is not verified no storing is performed and the decryption is abandoned otherwise the storing into the waiting keys collection is performed and the last generated state is also stored. The received new public keys (one-time and repeater) are now the latest ones and they are stored.

If cases 1 or 2 apply then it may happen that after the decryption several items in the store can be removed. Let x be the message number extracted from this message's public part's DH identifier. Sent keys collection: an item with message number less than x is removed. The one-time private key of message number x is removed if it exists in the collection. History data: an item whose message number is less or equal to x is removed. Signature keys collection: every item whose message number is less than x is removed.

If case 3 applies the store's waiting keys collection is used to provide the signature verification public key and the symmetric key for the message text's decryption. After signature verification and the text part's decryption and plaintext's mac value's verification the information relating to this message number in the waiting keys collection is removed. Please note that neither the history part nor the refresher key is studied in this case. The message text's starting position can be determined from the corresponding field in the public part of the message.

To clarify the effect of using the one-time key consider the following situation: Charlie obtains a snapshot of Alice's security data before Alice encrypts a message to Bob. The private keys of the new public keys in the Alice's message are thus not in the obtained snapshot. Now Bob responds with many messages to Alice before decrypting a newer message from Alice. Alice decrypts the replies in order the first one being the message x. Now Charlie obtains another snapshot before Alice decrypts the message number y in the middle of Bob's responses. Charlie has now the state and private key needed to decrypt Bob's message y and messages from y forward. However, Charlie cannot go backwards in the state chain and thus the message x and messages before y cannot be decrypted based on the newer snapshot. The older snapshot exists but the problem from Charlie's viewpoint is that when Alice decrypted the first message x she destroyed the one-time private key. Charlie cannot proceed forward from the older snapshot's state since a private key is missing. If there would not be this one-time key concept the private key used to decrypt messages x-y would enable Charlie to proceed forward from the older snapshot. If Alice would not decrypt the messages in order the situation would be still the same. The private key of the one-time key is destroyed when the state is iterated forward when processing the history data of a message.

During the initialization of the protocol both parties send to each other a one-time public key and a repeater public key with message number 0. The keys are stored into the sent keys collection with message number 0. A receiver of a repeater public key stores it into the signature key collection with message number 0. The receiver of a one-time and repeater keys stores them as the latest ones. Store's latest sent repeater key the receiver is known to posses is set be the just sent repeater key.

The states' initial values are determined by a DH exchange, this public key is in the same message that delivers the first one-time and repeater keys. Note that the number of blocks in the state depends on the requirements of the used PRG. In the following we assume that the state consists of two blocks, if this is not the case the arrangements can be easily altered according to the number of blocks used. Let $c_1$, $c_2$, $c_3$ and $c_4$ be fixed blocks of data, their size being the size of the state's block and let Enc(key,plaintext) be an encryption operation of a block cipher. If the public key used to initialize the states is bigger than the other public keys then a one-way hash function is used to produce either one block $dh_1$ or two blocks $dh_1$ and $dh_2$ from its DH shared secret. If there is one block $dh_1$ available then Alice's state for sending to Bob is $b_0=Enc(dh_1,c_1)$, $b_1=Enc(dh_1,c_2)$ which is also Bob's state for receiving from Alice. Bob's state for sending to Alice is $b_0=Enc(dh_1,c_3)$, $b_1=Enc(dh_1,c_4)$, which is also Alice's state for receiving from Bob. If two blocks $dh_1$ and $dh_2$ are available then Alice's state for sending to Bob is $b_0=Enc(dh_1,c_1)$, $b_1=Enc(dh_2,c_2)$ which is also Bob's state for receiving from Alice. Bob's state for sending to Alice is $b_0=Enc(dh_1,c_3)$, $b_1=Enc(dh_2,c_4)$, which is also Alice's state for receiving from Bob.

To convince the parties that the initialization messages are not altered they either a) are accompanied with a certificate and signed with the public key the certificate certifies or b) the parties compute a cryptographic checksum (hash value) of the message sent and received and ensure each other that the checksum is the same at both ends—this can be done by e.g. using voice contact.

Please note that the history part of a message varies in size when messages are sent and received. Although the history part is encrypted a casual observer might draw some conclusions based on its size. To prevent this the history part may be set to have a specific predetermined fixed size and if the actual required size exceeds this then a random value from some predetermined range is added to the required size. Let x be the most recently sent message by Alice. A message received by Alice which uses one of the public keys in message x as DH counterpart empties the history data of Alice. The next message Alice sends would have history data of zero size. The above-described method can be used to hide e.g. this information.

Please note that the message number in the public part of the message reveals how many messages the sender has created. If a casual observer then sees messages he can draw some conclusions on the messaging behaviour of the parties. To hide the starting point of the message number it can be started from some number that is derived from the DH shared secret in the protocol initialization phase.

Note also that if the one-time and the repeater public keys are placed in the message's text part then an adversary has no knowledge of a refresher key's DH public counterpart unless he has succeeded in decrypting the required message or has obtained a suitable snapshot. This provides protection if the underlying public key scheme or its implementation has weaknesses. The protocol itself also gives same kind of protection since a solved DH shared secret is not sufficient to produce a symmetric key—the proper stored state is also required.

The message's public part contains the starting point of the message's text part thus revealing the size of the history part. It is possible not to place this starting point information in the public part and thus avoid using the technique to hide the size of the history data. The solution is to add this starting point information into a list item of the history part's list. Now every list item contains also the starting point of the corresponding message's text part. During encryption operation when a new list item is added on top of the history data the current message's text part's starting point is stored into the added item.

If during a decryption the current message's number is seen to be greater than the latest decrypted one then the size of the current message's history part can be determined by decrypting the first one of its blocks, now the stored number—which tells how many items there are in the list—is used to compute the size of the history part.

If during a decryption the history part is used to produce symmetric keys then this starting point found in a list item is stored into the waiting keys collection together with the symmetric keys and the signature verification key. When the waiting keys collection is used to decrypt a message this stored starting point tells where to start the decryption of the text part. Using this solution there is no need to try to hide the history part's size from a casual observer.

FIG. 1 illustrates an embodiment of the present invention including message encryption 100. Three new public keys: refresher 144, one-time 145 and repeater 146 may be created and placed into a new message 130. A DH shared secret 110 may be computed between the refresher private key and the receiver's latest one-time or repeater public key 161 stored in computer-readable storage medium 160. The one-time key may be preferred one, but may be used only once. The number of the message labeled msg_num 141 may be the consecutive number of the messages sent. The dh_id 143 may contain the message number of the receiver's latest decrypted message and a value indicating whether the computed DH shared secret 110 was computed against a one-time or repeater public key.

The history data 163 in the computer's storage 160 may be copied into the message's history part 150 so that an item in the history part 150 is set to contain the public key and the dh_id of the fetched item. After that the history data 163 may be updated so that one item is added as the latest one and it contains the refresher public key 144, dh_id 143 and this message's number msg_num 141. The text 133 may be the data the user wants to encrypt. The textpos 142 may indicate the number of the first byte of the text 133. An encryption key for history part 114 is derived 112 from the DH shared secret 110, this can be done by e.g. computing the cryptographic hash value of DH shared secret 110. The history part 150 may be encrypted using this key 114. The current state for sending 162 may be fetched from the store 160 as $state_{cur}$ 120.

The KEY_GEN method 122 may use the DH shared secret 110 and the $state_{cur}$ 120 to generate a new $state_{cur+1}$ 124 and encryption key 126 and mac key 128. The mac 134 may be calculated over the text 133 using the mac key 128. The text 133 and the mac 134 may be encrypted using the encryption key 126. A signature private key 164 in store 160 may be used to calculate a digital signature 135 over the whole message 130. The newly created $state_{cur+1}$ 124 is stored into store 160 as state for sending 162. The created private keys of the one-time 145 and repeater 146 public keys together with the message number msg_num 141 may be stored into the store's 160 private keys collection 165. The private key of the refresher public key 144 is not stored but may be deleted. The received latest repeater public key 161 together with msg_num 141 may be stored into the public keys for signature verification collection 166.

Figure 2:
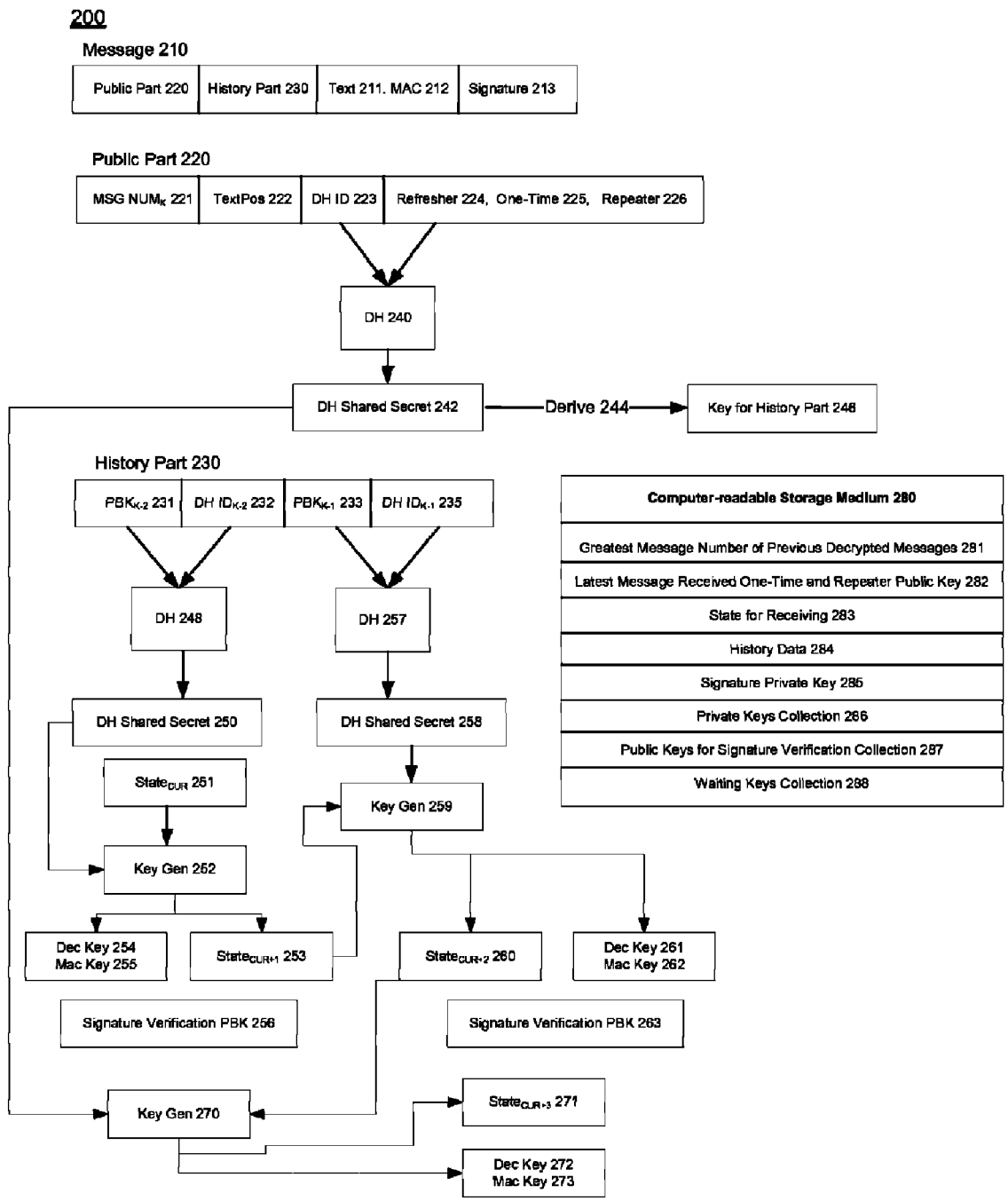
FIG. 2 illustrates a decryption operation according to an embodiment of the present invention.

FIG. 2 illustrates an embodiment of the present invention that includes message decryption 200. The message's public part's dh_id 223 may be used and from the strore's 280 public keys for signature verification collection 287 a public key may be fetched using the message number in the dh_id 223. The signature 213 at the end of the message is verified using the fetched public key, if the signature does not verify the decryption is abandoned else the dh_id 223 may be used again to fetch a private key from the private keys collection 286.

Using Diffie-Hellman calculation DH 240 a DH shared secret 242 may be computed between the fetched private key and the refresher 224 public key. A key for history part 246 may be derived 244 from the DH shared secret 242. The current state for receiving 283 may be fetched from the store 280 as $state_{cur}$ 251. Based on the greatest message number of previously decrypted messages 281 and the msg_num 221 of the current message it is decided whether or not there exists yet not decrypted messages between the latest decrypted one and and this message. If no such messages exist the history part 230 of the message may be not decrypted, or else it may be decrypted using the key for history part 246. Again based on the greatest message number of previously decrypted messages 281 and the msg_num 221 of the current message an item in the history part 230 is decided which corresponds to the first not yet decrypted message. Note that the last item in this example is the pair $pbk_{k-1}$ 233 and $dh\_id_{k-1}$ 234 that correspond to a message created just before this message 210, $pbk_{k-1}$ 233 being its refresher public key and $dh\_id_{k-1}$ 234 being its dh_id.

Starting from the found item ($pbk_{k-2}$ 231 and $dh\_id_{k-2}$ 232 in this example) a private key corresponding to the $dh\_id_{k-2}$ 232 may be fetched from the private keys collection 286 and using Diffie-Hellman calculation DH 248 a DH shared secret 250 is computed between the fetched private key and the item's public key $pbk_{k-2}$ 231. The item's $dh\_id_{k-2}$ 232 may be used again to fetch a signature verification public key 256 from public keys for signature verification collection 287. The KEY_GEN method 252 uses the DH shared secret 250 and the current $state_{cur}$ 251 to generate a new $state_{cur+1}$ 253 and decryption key 254 and mac key 255. The produced signature verification public key 256 and the generated decryption key 254 and mac key 255 may be stored in the main memory of the computer so that they can be found using their message number.

The rest of the history part's items corresponding to not yet decrypted messages may be processed in the same manner each item producing a DH shared secret which is inputted to the KEY_GEN together with a previously calculated state, each processed item in the history part 230 thus producing a decryption key, mac key and signature verification public key and a new state. When the history part 230 has been processed the KEY_GEN method 270 uses DH shared secret 242 and the latest generated $state_{cur+2}$ 260 to produce $state_{cur+3}$ 271 and decryption key 272 and mac key 273. Message 210 text 211 and mac 212 are decrypted using decryption key 272 and a mac is calculated over the text 211 using the mac key 273. If the calculated mac value does not equal the message's mac value 212 then decryption is abandoned else the generated state$_{cur+3}$ 271 is stored as state for receiving 283. The produced values of decryption keys, mac keys and signature verification public keys that where stored in the main memory when the history part 230 was processed are saved to the waiting keys collection 288, this saving is done so that these values can be fetched based on the message number in each item.

The one-time 225 and repeater 226 public keys are now set to be latest received one-time and repeater public key 282 in the store 280. Let z be the message number in the received message's 210 dh_id 223, the signature private key 285 is set to be a key in the private keys collection whose message number is z and that is a repeater key. Certain items from the store 280 can be removed based on the value of z. From the history data 284 items whose message number is less than or equal to z are removed, from the private keys collection 286 items whose message number is less than z are removed and the one-time private key whose message number is z is removed, from public keys for signature verification collection 287 items whose message number is less than z are removed.

The invention claimed is:

1. A computer-implemented method for encryption of a message comprising:
   generating by a processor a refresher public key, a one-time public key and a repeater public key, the one-time public key and the repeater public key each having an associated private key;
   generating a shared secret value based upon the refresher public key and one of a latest received one-time public key or the repeater public key, wherein the one-time public key is given priority over the repeater public key and the one-time public key expires after a single use;
   assigning to the message a Diffie-Hellman identification value to include a message number of a last decrypted message and a value indicating whether the shared secret value was generated using the one-time public key or the repeater public key;
   assigning to the message history data including a list of sent refresher public keys and associated Diffle-Hellman identification values created after a last sent message that has been received by a receiver;
   retrieving one or more states for sending from the computer-readable storage medium;
   generating one or more new keys using a key generator based upon the one or more states for sending, and the shared secret value;
   generating one or more new states for sending using a key generator based upon the one or more states for sending and the shared secret value;
   encrypting the message using the one or more new keys;
   storing in the computer-readable storage medium the one or more new states for sending, the private keys associated with the one-time public key and the repeater public key, and the message number for the message.

2. The computer-implemented method of claim 1, wherein the message includes a signature generated using a signature private key.

3. The computer-implemented method of claim 2, wherein encrypting the message further comprises:
   digitally signing the message using the signature generated using the signature private key.

4. The computer-implemented method of claim 1, wherein the history data is encrypted using an encryption key derived from the shared secret value.

5. The computer-implemented method of claim 1, further comprising:
   initializing the communication of the message between a sender and receiver, wherein the initializing includes receiving an initialization file and calculating a cryptographic hash function value of the received initialization file when compared to a sent initialization file.

6. The computer-implemented method of claim 5, wherein the received initialization file and the sent initialization file each contain a certificate and a signature.

7. The computer-implemented method of claim 1, wherein the history data is of a predetermined fixed size and if an actual required size exceeds the predetermined fixed size then a random value from a predetermined range is added to the actual required size to make a final size.

8. An article comprising a non-transitory computer-readable storage medium including instructions that, when executed by a processor, perform the steps of:
   generating by a processor a refresher public key, a one-time public key and a repeater public key, the one-time public key and the repeater public key each having an associated private key;
   generating a shared secret value based upon the refresher public key and one of a latest received one-time public key or the repeater public key, wherein the one-time public key is given priority over the repeater public key and the one-time public key expires after a single use;
   assigning to a message a Diffie-Hellman identification value to include a message number of a last decrypted message and a value indicating whether the shared secret value was generated using the one-time public key or the repeater public key;
   assigning to the message history data including a list of sent refresher public keys and associated Diffle-Hellman identification values created after a last sent message that has been received by a receiver;
   retrieving one or more states for sending from the computer-readable storage medium;
   generating one or more new keys using a key generator based upon the one or more states for sending and the shared secret value;
   generating one or more new states for sending using a key generator based upon the one or more states for sending and the shared secret value;
   encrypting the message using the one or more new keys;
   storing in the computer-readable storage medium the one or more new states for sending, the private keys associated with the one-time public key and the repeater public key, and the message number for the message.

9. The article of claim 8, wherein the message includes a signature generated using a signature private key.

10. The article of claim 9, wherein encrypting the message further comprises:
    digitally signing the message using the signature generated using the signature private key.

11. The article of claim 8, wherein the history data is encrypted using an encryption key derived from the shared secret value.

12. The article of claim 8, further comprising:
    initializing the communication of the message between a sender and receiver, wherein the initializing includes receiving an initialization file and calculating a cryptographic hash function value of the received initialization file when compared to a sent initialization file.

13. The article of claim 12, wherein the received initialization file and the sent initialization file each contain a certificate and a signature.

14. The article of claim 8, wherein the history data is of a predetermined fixed size and if an actual required size exceeds the predetermined fixed size then a random value from a predetermined range is added to the actual required size to make a final size.

15. A computer system comprising:
a computer-readable storage medium; and
a processor programmed to perform the steps of:
  generating by the processor a refresher public key, a one-time public key and a repeater public key, the one-time public key and the repeater public key each having an associated private key;
  generating a shared secret value based upon the refresher public key and one of a latest received one-time public key or the repeater public key, wherein the one-time public key is given priority over the repeater public key and the one-time public key expires after a single use;
  assigning to a message a DH identification value to include a message number of a last decrypted message and a value indicating whether the shared secret value was generated using the one-time public key or the repeater public key;
  assigning to the message history data including a list of sent refresher public keys and associated DH identification values created after a last sent message that has been received by a receiver; p2 retrieving one or more states for sending from the computer-readable storage medium;
  generating one or more new keys using a key generator based upon the one or more states for sending and the shared secret value;
  generating one or more new states for sending using a key generator based upon the one or more states for sending and the shared secret value;
  encrypting the message using the one or more new keys;
  storing in the computer-readable storage medium the one or more new states for sending, the private keys associated with the one-time public key and the repeater public key, and the message number for the message.

16. The computer system of claim 15, wherein the message includes a signature generated using a signature private key.

17. The computer system of claim 16, wherein encrypting the message further comprises:
  digitally signing the message using the signature generated using the signature private key.

18. The computer system of claim 15, wherein the history data is encrypted using an encryption key derived from the shared secret value.

19. The computer system of claim 15, further comprising:
  initializing the communication of the message between a sender and receiver, wherein the initializing includes receiving an initialization file and calculating a cryptographic hash function value of the received initialization file when compared to a sent initialization file.

20. The computer system of claim 19, wherein the received initialization file and the sent initialization file each contain a certificate and a signature.

* * * * *